(12) United States Patent
Jong

(10) Patent No.: US 8,545,651 B1
(45) Date of Patent: Oct. 1, 2013

(54) ARCHITECTURAL WICKER STRUCTURES, AND METHOD

(76) Inventor: Oe Miauw Jong, Woodland Hills, CA (US)

( * ) Notice: Subject to any disclaimer, the term of this patent is extended or adjusted under 35 U.S.C. 154(b) by 394 days.

(21) Appl. No.: 12/803,959

(22) Filed: Jul. 12, 2010

(51) Int. Cl.
*E04F 13/072* (2006.01)
*E04F 13/08* (2006.01)
*E04F 13/16* (2006.01)
*E04F 13/18* (2006.01)
*C09J 5/00* (2006.01)
*B29C 65/52* (2006.01)
*B32B 37/12* (2006.01)
*B32B 37/18* (2006.01)

(52) U.S. Cl.
USPC ..... 156/71; 156/307.3; 156/307.5; 156/307.7

(58) Field of Classification Search
USPC ............... 156/71, 229, 272.2, 273.3, 273.5, 156/307.1, 307.3, 307.4, 307.5, 307.7
See application file for complete search history.

(56) References Cited

U.S. PATENT DOCUMENTS 3,625,795 A * 12/1971 Knechtges et al. ........... 156/241
4,713,132 A * 12/1987 Abel et al. .................... 156/73.1
6,132,886 A * 10/2000 Share ........................... 428/500

\* cited by examiner

*Primary Examiner* — Sing P Chan
(74) *Attorney, Agent, or Firm* — William W. Haefliger

(57) ABSTRACT

In combination, flexible synthetic resinous wicker extending in a first plane, a relatively stiff backer sheet having side thereof intermittently bonded to the wicker to extend in a second plane, generally parallel with the first plane, the backer sheet configured to provide intermittent support to the wicker.

13 Claims, 4 Drawing Sheets

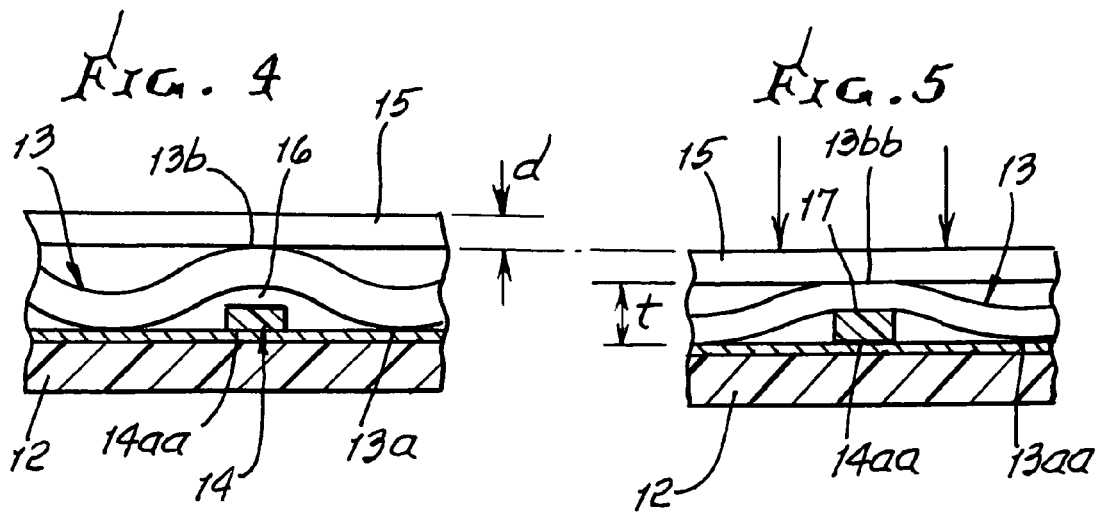
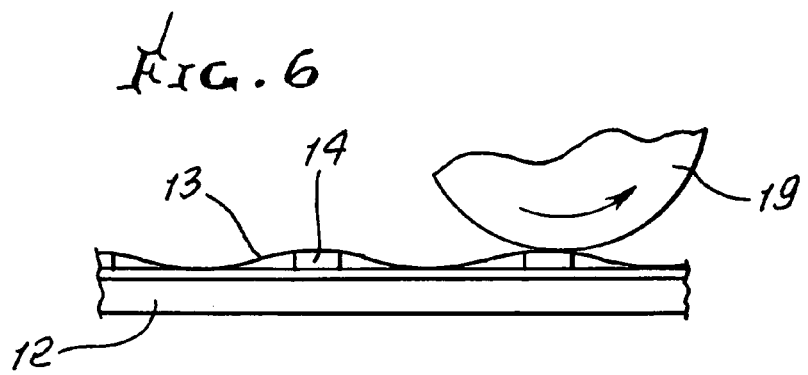
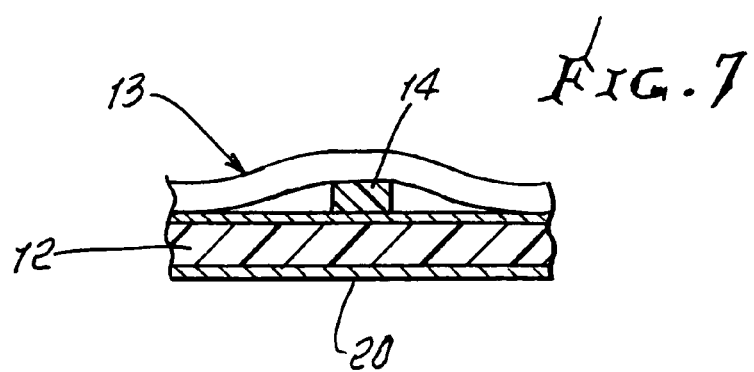

ARCHITECTURAL WICKER STRUCTURES, AND METHOD

BACKGROUND OF THE INVENTION

This invention relates generally to ornamental or architectural use of wicker formed in a pattern or patterns; and more particularly to provision and support of such wicker production products, enabled by wicker support as in panel configurations.

There is perceived need and/or use of attractive wicker in ornamental or architectural modes, as for example on interior walls of buildings and other structures. Wicker is typically flexible, and presents problems of firmly supported application to wall surfaces; for example, wicker is typically formed to have strand crests and crest surfaces, which are difficult to firmly attach to upright walls.

SUMMARY OF THE INVENTION

It is a major object of the invention to provide means to overcome the above problems and disadvantages and to provide highly useful and efficient solutions to such problems. Basically, the invention provides:

a) flexible synthetic resinous wicker extending in a first plane, b) a relatively stiff backer sheet having a side intermittently bonded to the wicker to extend in a second plane, generally parallel with the first plane, c) the backer sheet configured to provide intermittent support to the wicker, and to be attachable to a wall surface.

As will be seen, adhesive is applied at intermittent bond locations between the wicker and backer sheet, for example to be cured while the wicker is compression deformed, so as to be tensioned. The wicker typically defines crests facing toward the backer sheet, the adhesive concentrated at surfaces defined by the crests, the wicker being deformed. As a result, the backer sheet and wicker define a laminated composite, the wicker being stiffened and rigidized as the adhesive cures, whereby the composite defines a structural unit to serve as a stiff panel or panels easily assembled against and attachable to a wall. If the wall is deformable, the panels can be attached as by fasteners, during assembly; or, the panel backer surface can be adhesively bonded to the wall.

Typically, the backer sheet may consist of one or more of the following:
  i) cementitious material
  ii) metallic material
  iii) aluminum
  iv) magnesium
  v) polyurethane Also the adhesive may be polyurethane based.

The wicker and backer may consist of thermoplastic material or materials, whereby the composite can be temporarily heated, and deformed into required shape, for wall or other surface covering.

Another object is to provide a wicker and backer sheet laminated composite having a selected pattern severed edge portion, the wicker edge portion bonded to a backer sheet edge portion to block unraveling of the wicker at edges of the composite.

Yet another object includes provision of a method that includes the following steps:
  i) applying adhesive to a surface of the backer sheet,
  ii) applying the wicker to that surface of the backer sheet, so that adhesive on the backer sheet contacts crests formed by the wicker,
  iii) and exerting pressure on the wicker directed toward the backer sheet to enhance adhesive attachment of deformed or flattened crests to the backer, while tensioning the wicker to form an integral stabilized wicker panel.

Also, the method may include the step of subsequently exerting and maintaining continuous pressure against the wicker and directed toward the backer sheet, during curing of the adhesive to effect bonding. The pressure is sufficient to deform the wicker as at the strand crests, thereby tensioning the wicker for integrating the wicker as it bonds to the backer sheet, thereby to provide a single strong panel wall adapted for application to a wall surface, along with other such panels, in pattern configuration. For example, the steps may include providing first and second such panels which are visibly different, and selectively installing or assembling such visually different wicker panels in architectural relation, as on a wall.

A further advantage is that the age-defying, high-performance indoor/outdoor paneling can be made from 100% recyclable, non-toxic and UV-tested wicker fiber, water-resistant and insensitive to the sun, chlorine and harsh weather, its beauty not fading. It may be made in the form of woven panels with laminated backs, formed from 100% post-production recycled materials. It can also be easily modified with carpentry tools.

These and other objects and advantages of the invention, as well as the details of an illustrative embodiment, will be more fully understood form the following specification and drawings, in which:

DRAWING DESCRIPTION

FIG. 4 is an enlarged section showing wicker crests positioned to recess pressure exertion;

FIG. 5 is like FIG. 4, but showing deflection of pressurized wicker crests, and in relation to adhesive;

FIG. 6 shows an alternate mode of pressure application;

FIG. 7 is a section showing use of a peel off layer, on the backer;

DETAILED DESCRIPTION

Figure 1:
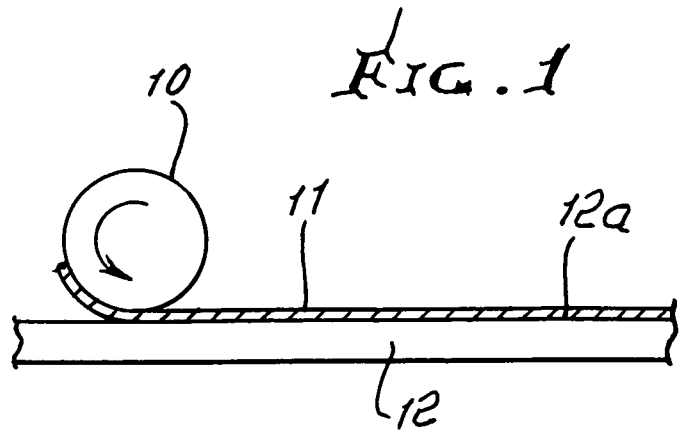
FIG. 1 is an elevation showing adhesive application to a backer.

FIG. 1, liquid adhesive is applied by a roller 10 in a thin layer 11 on a surface 12*a* of a backer sheet 12. That sheet is normally relatively stiff and lightweight, being between about ⅛ and ½ inches thick. The backer may typically consist of one or more of the following:
  i) cementitious material
  ii) metallic material
  iii) aluminum
  iv) magnesium
  v) polyurethane The adhesive may be polyurethane based.

Figure 2:
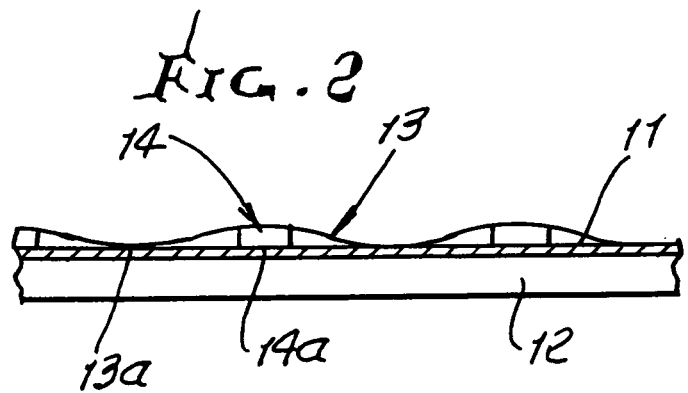
FIG. 2 is like FIG. 1, but showing application of wicker sheet to the adhesive layers.
Figure 3:
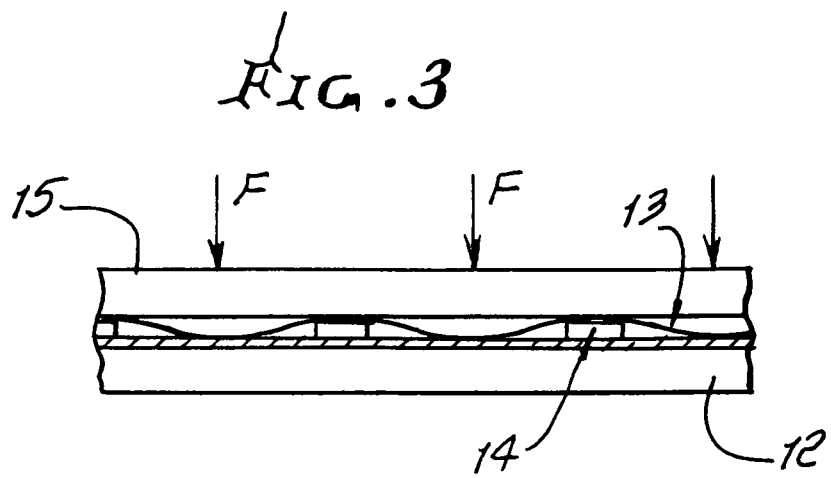
FIG. 3 is like FIG. 2, but showing pressure exertion to the applied wicker.
Figure 8:
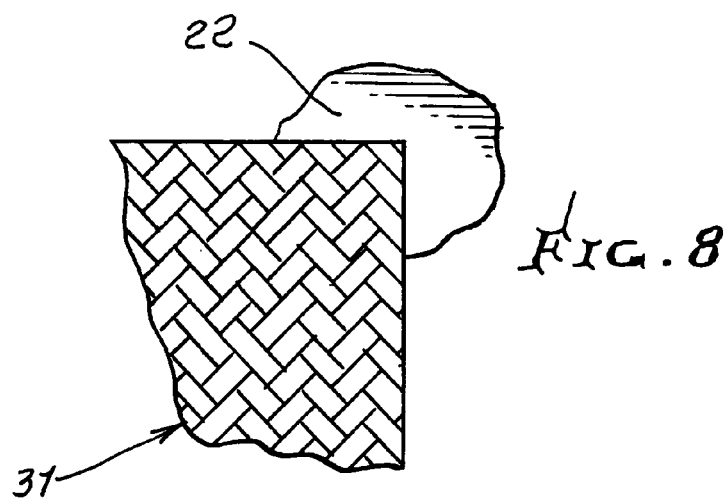
FIGS. 8-11 are elevation views showing different representative forms of wicker that can be used.
Figure 9:
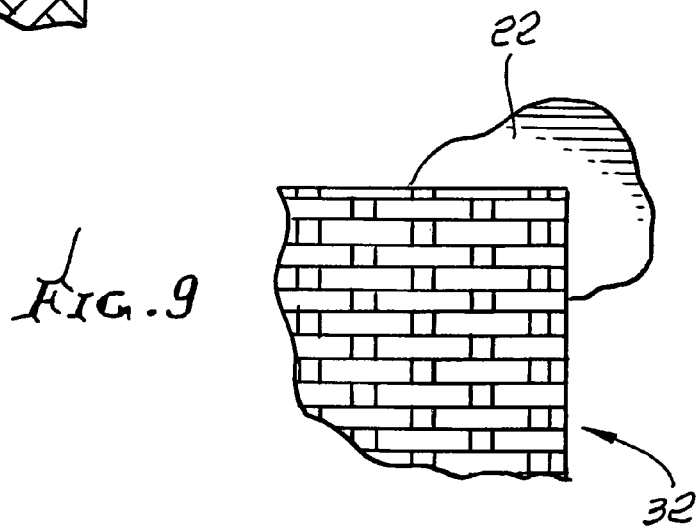
Figure 10:
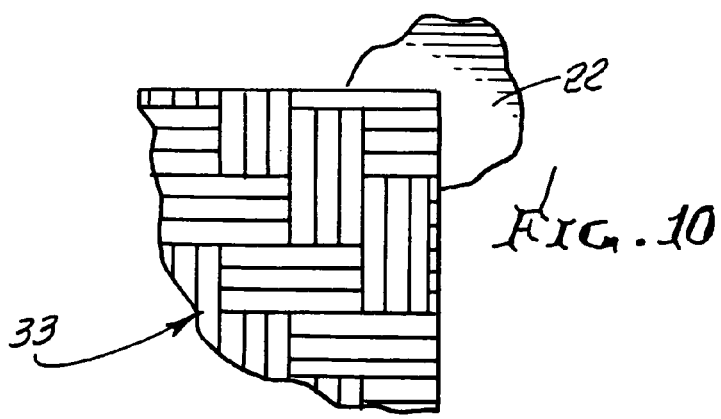
Figure 11:
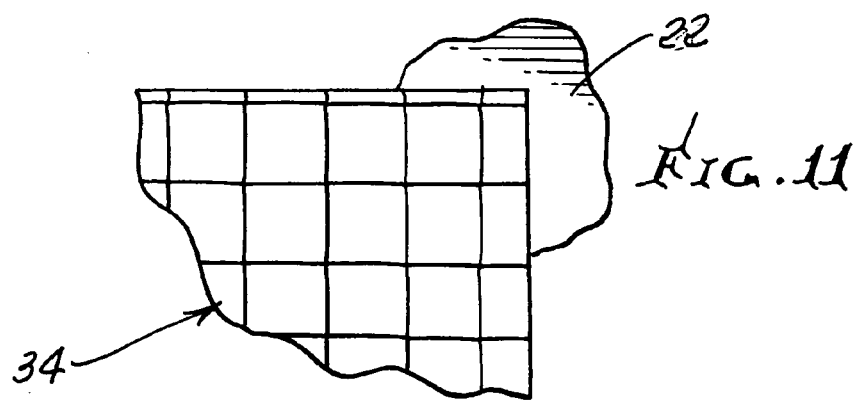

In FIG. 2, a flexible sheet 13 of wicker material is laid on the adhesive, so that the downward facing crests 13*a* and 14*a* of the interwoven warp and woof strands 13 and 14 are in downward contact with the adhesive. In FIG. 3, a pusher panel 15 has been applied to the upper side of the wicker material, enabling force F to be applied to the panel for transmission to, and compression deflection of the wicker.

FIG. 4 shows the pusher panel 15 touching the upward facing crests 13b of the wicker warp strands 13, the panel 15 also engaging the upward facing crests of the woof strands.

FIG. 5 shows the pusher panel 15 having been displaced downwardly by dimension "d", to compress the wicker as a result of downward compression of warp and woof upper crests. This results in compression of warp and woof downward facing crests, 13a and 14a, and flattening of such crests, indicated at 13aa and 14aa in FIG. 5, to provide significantly greater adhesive contact area with such flattened crests; reduced wicker thickness "t", take-up of clearances, as at 16 between warp and woof strands, and tightening together of the wicker components, so that after the adhesive is cured, the wicker and backer form a tensioned, cohesive, integral and firm unit or composite. FIG. 5 shows warp strand 13 engaging woof strand 14, as at 17, below crest 13bb.

FIG. 6 shows an alternate means, such as a pressure roller 19, for exerting downward pressure on the wicker, as the roller is traveled lengthwise over the wicker upper surface.

FIG. 7 shows a "peel-off" layer 20, carried by the backer, so that when the integrated composite is to be applied to a wall surface, layer 20 is removed or peeled-off to expose adhesive 21 on the backer to adhere to the wall surface.

Figure 12:
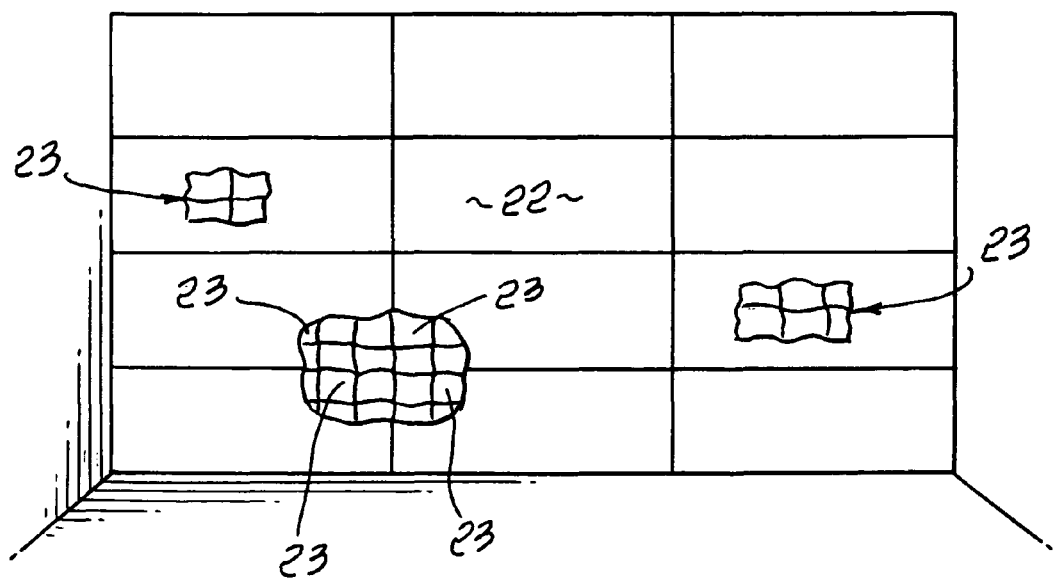
FIG. 12 is an elevation showing backed panel composites applied to a wall, with wicker visually extending continuously as it faces toward the viewer.

FIGS. 8-11 show various wicker attractive configurations 31-34 for application with the composites to a wall surface 22, indicated in FIG. 12. As shown, a number of like composites 23 are then applied in edge-to-edge relation to wall surface 22 for enhanced ornamental or architectural effect. Composites 23 may visually differ, as for example as shown in FIGS. 8-11.

The wicker may take the form of thatch configuration with random oriented strands extending in overlying configuration.

The wicker warp and woof strands typically have widthwise flat crest surfaces, the strands having width "2" and thickness "t", where w>>t. The wicker and backer may have a severed edge portion, the wicker edge portion bonded to backer sheet edge portions to block unraveling of the wicker at edges of the composite.

I claim:

1. The method of forming an integral and stabilized wicker panel comprising:
    a) providing a flexible synthetic resinous wicker extending generally in a first plane;
    b) providing a relatively stiff backer sheet having a side, bonding said wicker to said side intermittently in a second plane, generally parallel with the first plane;
    c) wherein said backer sheet is configured to provide intermittent support to the wicker, allowing wicker adjustment positioning between locations of said intermittent support;
    d) wherein said bonding method further includes the steps:
        i) applying adhesive to a surface of said backer sheet;
        ii) applying said wicker to said surface of the backer sheet so that adhesive on the backer sheet contacts crests formed by the wicker;
        iii) and exerting pressure on the wicker directed toward the backer sheet to enhance adhesive attachment of flattened crests to the backer sheet to form said integral and stabilized wicker panel, while allowing the wicker to become stiffened and rigidized as the adhesive cures;
    e) said wicker defining crests that face toward the backer sheet, the adhesive concentrated at surfaces defined by the crests, and the crest surfaces being flattened at adhesive concentration locations;
    f) wherein said wicker and said backer sheet consist of thermoplastic material, and have a non-planar configuration formed after heating thereof;
    g) and wherein said wicker and said backer sheet form said integral and stabilized wicker panel in the form of a laminated composite having a selected pattern severed edge portion, defined by a wicker edge portion bonded to a backer sheet edge portion blocking unraveling of the wicker at an edge of the composite.

2. The method of claim 1 wherein adhesive extends at intermittent bond locations between the wicker and the backer sheet.

3. The method of claim 1 wherein the backer sheet consists of at least one of the following:
    i) cementitious material
    ii) metallic material
    iii) polyurethane.

4. The method of claim 1 wherein the adhesive is a polyurethane based adhesive.

5. The method of claim 1 wherein the backer sheet and wicker are located to define a multi-edged panel.

6. The method of claim 5 including multiple said panels extending in edge-to-edge configuration, to provide a decorative surface.

7. The method of claim 1 wherein the wicker consists of woven warp and woof strands having said flattened flat crest surfaces, the strands having width "w" and thickness "t", where w>>t.

8. The method of claim 1 including subsequently exerting and maintaining continuous pressure against the wicker and directed toward the backer sheet, during curing of the adhesive to effect localized bonding.

9. The method of claim 1 including providing multiple of said integral and stabilized panels, and attaching said integral and stabilized panels in edge-to-edge relation.

10. The method of claim 1 includes attaching said backer sheet to a support panel wherein the wicker is presented away from the support panel to form a decorative panel.

11. The method of claim 10 includes installing a plurality of the decorative panels in an architectural relation.

12. The method of claim 10 further includes providing a wicker of a first interwoven strand configuration for said integral and stabilized wicker panel and defining a first decorative panel, providing a second wicker of a second interwoven strand configuration for said integral and stabilized wicker panel and defining a second decorative panel visually different from said first decorative panel; and selectively installing said decorative panels, in an architectural relation.

13. The method of claim 1 wherein the wicker consists of one of the following:
    $x_1$) woven strands
    $x_2$) non-woven strands
    $x_3$) random oriented strands
    $x_4$) underlying and overlying strands.

* * * * *